United States Patent [19]

Dubnoff

[11] Patent Number: 5,033,009

[45] Date of Patent: Jul. 16, 1991

[54] SYSTEM FOR GENERATING WORKSHEET FILES FOR ELECTRONIC SPREADSHEETS

[76] Inventor: Steven J. Dubnoff, 1001 Fourth Ave., Ste. 3200, Seattle, Wash. 98154

[21] Appl. No.: 319,218

[22] Filed: Mar. 3, 1989

[51] Int. Cl.$^5$ .............................................. G06F 15/20
[52] U.S. Cl. ...................................................... 364/523
[58] Field of Search .............................. 364/518–521, 364/523; 340/716, 721, 723

[56] References Cited

U.S. PATENT DOCUMENTS

| 4,674,043 | 6/1987 | Hernandez et al. | 364/900 |
| 4,723,211 | 2/1988 | Barker et al. | 364/300 |
| 4,939,689 | 7/1990 | Davis et al. | 364/900 |

OTHER PUBLICATIONS

*1—2-3 Release 2.2 Quick Reference*, 1989, pp. 102–129.

Primary Examiner—Heather R. Herndon

Attorney, Agent, or Firm—Christensen, O'Connor, Johnson & Kindness

[57] ABSTRACT

A method for automating the production of worksheet files of the type used by electronic spreadsheet programs. The spreadsheet program has an associated filed format specification that defines the format in which the spreadsheet program stores and receives data in a worksheet file. The spreadsheet program is capable of processing the worksheet files to produce an output spreadsheet. The method of the invention comprises receiving pattern data specifying positions for one or more variable data items to appear on the output spreadsheet, receiving variable data specifying the variable data items, and merging the pattern and variable data to produce merge data specifying the variable data items and their positions. The merged data is then output into the worksheet filed in said format, such that the spreadsheet program can then use the worksheet file to produce the output spreadsheet having the variable data items at the specified positions.

7 Claims, 11 Drawing Sheets

| OFFICE | PRODUCT | PRICE | Q1 | Q2 |
|---|---|---|---|---|
| CHICAGO | ACME | 2.25 | 2.00 | 5.00 |
| CHICAGO | GALACTIC | 4.15 | 20.00 | 22.00 |
| CHICAGO | PARAMOUNT | 1.85 | 5.00 | 8.00 |
| CHICAGO | SUPERIOR | 5.95 | 8.00 | 5.00 |
| PARIS | ACME | 2.25 | 10.00 | 12.00 |
| PARIS | GALACTIC | 4.15 | 5.00 | 7.00 |
| PARIS | PARAMOUNT | 1.85 | 30.00 | 28.00 |
| PARIS | SUPERIOR | 5.95 | 25.00 | 30.00 |
| ROME | ACME | 2.25 | 4.00 | 8.00 |
| ROME | GALACTIC | 4.15 | 3.00 | 4.00 |
| ROME | RACING | 8.25 | 2.00 | 3.00 |
| ROME | SUPERIOR | 5.95 | 5.00 | 3.00 |

Fig. 3.

|   | A | B | C | D | E | F |
|---|---|---|---|---|---|---|
| 1 |   |   | International Widget Works |   |   |   |
| 2 |   |   | Global Sales Forecast |   |   |   |
| 3 |   |   |   |   |   |   |
| 4 |   |   | ACT | ACT | TOTAL | TOTAL |
| 5 | Office | Product | Q1 | Q2 | UNITS | DOLLARS |
| 6 |   |   | === | === | === | === |
| 7 | !DATA |   |   |   |   |   |
| 8 | >OFFICE | >PRODUCT | >Q1 | >Q2 | 0 | 0 |
| 9 | !FOOTING |   |   |   |   |   |
| 10 |   |   | *SUM | *SUM | *SUM | *SUM |
| 11 | GRAND TOTAL |   |   |   |   |   |

F20: (C0) @SUM(F7..F18)

|   | A | B | C | D | E | F | H | I |
|---|---|---|---|---|---|---|---|---|
| 1 | | | International Widget Works | | | | | |
| 2 | | | Global Sales Forecast | | | | | |
| 3 | | | | | | | | |
| 4 | | | ACT | ACT | TOTAL | TOTAL | | |
| 5 | Office | Product | Q1 | Q2 | UNITS | DOLLARS | | |
| 6 | | | === | === | === | === | | |
| 7 | CHICAGO | ACME | 2 | 5 | 7 | $15,750 | | |
| 8 | CHICAGO | GALACTIC | 20 | 22 | 42 | $174,300 | | |
| 9 | CHICAGO | PARAMOUNT | 5 | 8 | 13 | $24,050 | | |
| 10 | CHICAGO | SUPERIOR | 8 | 5 | 13 | $77,350 | | |
| 11 | PARIS | ACME | 10 | 12 | 22 | $49,500 | | |
| 12 | PARIS | GALACTIC | 5 | 7 | 12 | $49,800 | | |
| 13 | PARIS | PARAMOUNT | 30 | 28 | 58 | $107,300 | | |
| 14 | PARIS | SUPERIOR | 25 | 30 | 55 | $327,250 | | |
| 15 | ROME | ACME | 4 | 8 | 12 | $27,000 | | |
| 16 | ROME | GALACTIC | 3 | 4 | 7 | $29,050 | | |
| 17 | ROME | RACING | 2 | 3 | 5 | $41,250 | | |
| 18 | ROME | SUPERIOR | 5 | 3 | 8 | $47,600 | | |
| 19 | | | === | === | === | === | | |
| 20 | GRAND TOTAL | | 119 | 135 | 254 | $970,200 | | |

|    | A | B | C | D | E | F | H | I |
|----|---|---|---|---|---|---|---|---|
| 1  |   | International Widget Works | | | | | | |
| 2  |   | Global Sales Forecast | | | | | | |
| 3  |   | | | | | | | |
| 4  |   | | ACT | ACT | TOTAL | TOTAL | | |
| 5  |   | Model | Q1 | Q2 | UNITS | DOLLARS | | |
| 6  |   | ═══ | ═══ | ═══ | ═══ | ═══ | | |
| 7  | !DATA | | | | | | | |
| 8  |   | >PRODUCT | >Q1 | >Q2 | 0 | $0 | | |
| 9  | !BY OFFICE | | | | | | | |
| 10 | !SUBHEAD | | | | | | | |
| 11 | >OFFICE | | | | | | | |
| 12 | !SUBFOOT | | | | | | | |
| 13 |   | | ─── | ─── | ─── | ─── | | |
| 14 | SUBTOTAL >OFFICE | | *SUM | *SUM | *SUM | *SUM | | |
| 15 |   | | ═══ | ═══ | ═══ | ═══ | | |
| 16 | !FOOTING | | | | | | | |
| 17 |   | | *SUM | *SUM | *SUM | *SUM | | |
| 18 | GRAND TOTAL | | ═══ | ═══ | ═══ | ═══ | | |
| 19 |   | | | | | | | |
| 20 |   | | | | | | | |

*fig. 6.*

F32: (CO) [W13] @SUM (F8..F11,F16..F19,F24..F27)

| | A | B | C | D | E | F | H | I |
|---|---|---|---|---|---|---|---|---|
| 14 | | | | | | | | |
| 15 | PARIS | | | | | | | |
| 16 | | ACME | 10 | 12 | 22 | $49,500 | | |
| 17 | | GALACTIC | 5 | 7 | 12 | $49,000 | | |
| 18 | | PARAMOUNT | 30 | 28 | 58 | $107,300 | | |
| 19 | | SUPERIOR | 25 | 30 | 55 | $327,250 | | |
| 20 | | | — | — | — | — | | |
| 21 | SUBTOTAL PARIS | | 70 | 77 | 147 | $533,050 | | |
| 22 | | | | | | | | |
| 23 | ROME | | | | | | | |
| 24 | | ACME | 4 | 8 | 12 | $27,000 | | |
| 25 | | GALACTIC | 3 | 4 | 7 | $29,050 | | |
| 26 | | RACING | 2 | 3 | 5 | $41,250 | | |
| 27 | | SUPERIOR | 5 | 3 | 8 | $47,600 | | |
| 28 | | | — | — | — | — | | |
| 29 | SUBTOTAL ROME | | 14 | 18 | 32 | $144,900 | | |
| 30 | | | | | | | | |
| 31 | | | ═ | ═ | ═ | ═ | | |
| 32 | GRAND TOTAL | | 119 | 135 | 254 | $970,200 | | |
| 33 | | | | | | | | |

Fig. 7.

E8: (,0) @SUM(C8..D8)

|   | A | B | C | D | E |
|---|---|---|---|---|---|
| 1 |   | International Widget Works | | | |
| 2 |   | Global Sales Forecast | | | |
| 3 |   |   |   |   |   |
| 4 |   |   | ACT | ACT | TOTAL |
| 5 |   |   | Q1 | Q2 | UNITS |
| 6 |   |   |   |   |   |
| 7 | !DATA |   |   |   |   |
| 8 | >PRODUCT |   | >Q1 | >Q2 | 0 |
| 9 | !BY PRODUCT |   |   |   |   |
| 10 |   |   |   |   |   |
| 11 | !FOOTING |   | ═ | ═ | ═ |
| 12 |   |   | *SUM | *SUM | *SUM |
| 13 | GRAND TOTAL |   |   |   |   | fig. 8.

E11: (,0) @SUM(C11..D11)

| | A | B | C | D | E | F | G | H |
|---|---|---|---|---|---|---|---|---|
| 1 | International Widget Works | | | | | | | |
| 2 | Global Sales Forecast | | | | | | | |
| 3 | | | | | | | | |
| 4 | | | ACT | ACT | TOTAL | | | |
| 5 | | | Q1 | Q2 | UNITS | | | |
| 6 | | | === | === | === | | | |
| 7 | ACME | | 16 | 25 | 41 | | | |
| 8 | GALACTIC | | 28 | 33 | 61 | | | |
| 9 | PARAMOUNT | | 35 | 36 | 71 | | | |
| 10 | RACING | | 2 | 3 | 5 | | | |
| 11 | SUPERIOR | | 38 | 38 | 76 | | | |
| 12 | | | === | === | === | | | |
| 13 | GRAND TOTAL | | 119 | 135 | 254 | | | | fig. 9.

B3: [W15] ">OFFICE

|   | A | B | C | D | E | F | G | H |
|---|---|---|---|---|---|---|---|---|
| 1 |   |   |   |   |   |   |   |   |
| 2 | International Widget Works |   |   |   |   |   |   |   |
| 3 | Global Sales Forecast |   |   |   |   |   |   |   |
| 4 | >OFFICE Office |   |   |   |   |   |   |   |
| 5 |   |   |   |   |   |   |   |   |
| 6 |   |   | ACT | ACT | TOTAL | TOTAL |   |   |
| 7 | Model |   | Q1 | Q2 | UNITS | DOLLARS |   |   |
| 8 |   |   | === | === | === | === |   |   |
| 9 | !DATA |   | >Q1 | >Q2 | 0 | $0 |   |   |
| 10 |   |   |   |   |   |   |   |   |
| 11 | !BY OFFICE WRITE-NEW |   |   |   |   |   |   |   |
| 12 | !FOOTING |   |   |   |   |   |   |   |
| 13 |   |   | *SUM | *SUM | *SUM | *SUM |   |   |
| 14 |   |   |   |   |   |   |   |   |
| 15 | TOTAL >OFFICE |   |   |   | *SUM | *SUM |   |   |

Fig. 10.

B3: [W/15] "ROME

|    | A | B | C | D | E | F | G | H |
|----|---|---|---|---|---|---|---|---|
| 1  | International Widget Works | | | | | | | |
| 2  | Global Sales Forecast | | | | | | | |
| 3  | ROME Office | | | | | | | |
| 4  | | | | | | | | |
| 5  | | | ACT | ACT | TOTAL | TOTAL | | |
| 6  | Model | | Q1 | Q2 | UNITS | DOLLARS | | |
| 7  | | | === | === | === | === | | |
| 8  | ACME | | 4 | 8 | 12 | $27,000 | | |
| 9  | GALACTIC | | 3 | 4 | 7 | $29,050 | | |
| 10 | RACING | | 2 | 3 | 5 | $41,250 | | |
| 11 | SUPERIOR | | 5 | 3 | 8 | $47,600 | | |
| 12 | | | — | — | — | | | |
| 13 | TOTAL ROME | | 14 | 18 | 32 | $144,900 | | |

*fig. 11.*

SYSTEM FOR GENERATING WORKSHEET FILES FOR ELECTRONIC SPREADSHEETS

FIELD OF THE INVENTION

The present invention relates to data processing techniques and, in particular, to a technique for generating worksheet files of the type used by electronic spreadsheets.

BACKGROUND OF THE INVENTION

In recent years, electronic spreadsheets have become well known tools for manipulating information on a computer. A conventional (nonelectronic) spreadsheet typically consists of numeric data arranged in a row-and-column format, together with identifying information such as column headings and the like. A spreadsheet for tabulating costs, for example, might associate each row with a different cost category, and each column with a different time period. The spreadsheet would typically include row totals showing the total of each cost category over time, and column totals showing the total cost for each time period.

An electronic spreadsheet is a computer program for creating, modifying and displaying spreadsheets. Like its nonelectronic counterpart, an electronic spreadsheet organizes data in a two-dimensional pattern of rows and columns, although three and higher dimensional electronic spreadsheets can also be used. Each intersection of a row and a column is termed a cell. The electronic spreadsheet can store a data string in each cell. In general, the data string can include a numeric value such as a cost figure, a label such as a column heading, a date, a formula for computing a numeric value based upon numeric values contained in other cells, and/or format information indicating how data is to be displayed. Typically, the spreadsheet program can also store parameters applicable to multiple cells, such as column widths and default formats.

When the electronic spreadsheet program displays a spreadsheet, either on a computer screen or in a printed report, the electronic spreadsheet does not display the data strings contained in each cell. Rather, the electronic spreadsheet interprets the contents of each cell, and displays the results. For example, if a cell contains numeric or label data, then such data is displayed, modified by any format information contained in the cell. Format information may specify the number of decimal places for numeric values, the format for displaying a date value, etc. When a cell contains a formula, the electronic spreadsheet evaluates the formula, and displays the result, again according to whatever format information the cell may contain.

Although electronic spreadsheet programs have many advantages with respect to manual spreadsheets, there are nevertheless a number of applications for which electronic spreadsheets require a considerable amount of repetitive effort. For example, suppose that one periodically receives numeric information that is to be displayed in a spreadsheet. Although many spreadsheet programs provide ways for electronically receiving such information and placing it in spreadsheet cells, it is nevertheless necessary to then add the labels, formulas, and format information necessary to produce a finished spreadsheet. With existing spreadsheet programs, the steps of adding such information must be performed each time that new numeric data is received.

SUMMARY OF THE INVENTION

The present invention provides a computer-based technique for automating the production of worksheet files of the type used by electronic spreadsheet programs. For each spreadsheet program, there is an associated file format specification that defines the format in which the spreadsheet program stores and retrieves data in a worksheet file. The spreadsheet program includes means for processing a worksheet file that is in such a format, to produce an output spreadsheet. The method of the present invention comprises the steps of receiving pattern data specifying a position for one or more variable data items to appear on the output spreadsheet, receiving variable data specifying the variable data items, and merging the pattern and variable data to produce merged data specifying the variable data items and their positions. The merged data is output into the worksheet file in said format. The spreadsheet program can then use the worksheet file to produce the output spreadsheet having the variable data items at the specified positions. The received pattern data may be in the same format, such that the pattern data can be created by the spreadsheet program.

In a preferred embodiment, the merging step comprises aggregating the variable data items to produce an aggregated data item. The merged data specifies the aggregated data item, such that the aggregated data item appears in the output spreadsheet. In another preferred embodiment, the outputting step comprises outputting the merged data into a plurality of worksheet files, such that each variable data item is contained in a different worksheet file. Further preferred aspects include those in which the merged data specifies a formula that will cause the spreadsheet program to determine an evaluated data item based upon one or more variable data items. The number of variable data items used to determine the evaluated data item may be a function of the number of variable data items received.

BRIEF DESCRIPTION OF THE DRAWINGS

FIGS. 4 and 5 illustrate computer screen displays of a first pattern data file and the resulting worksheet file;

DETAILED DESCRIPTION OF THE INVENTION

Figure 1:
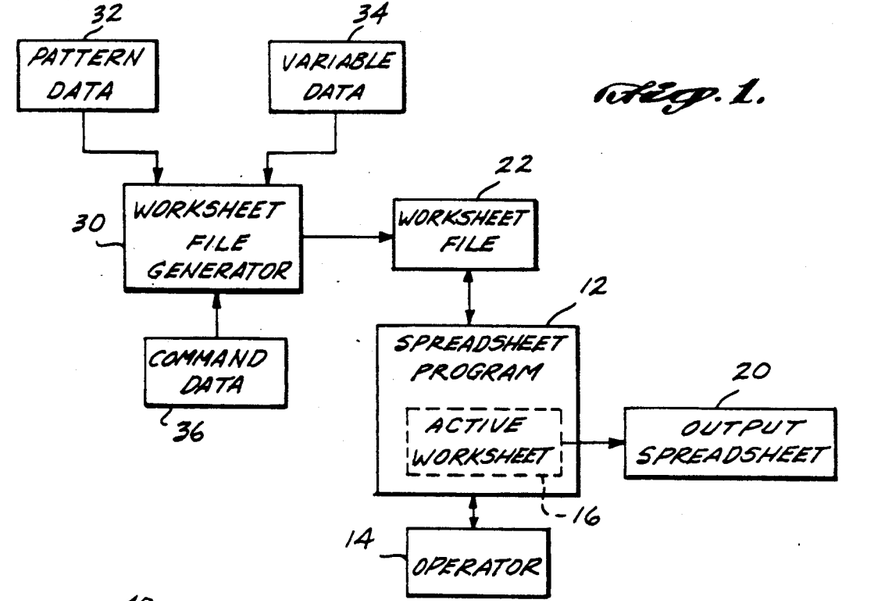
FIG. 1 is a block diagram conceptually illustrating the relationship of the present invention to a conventional electronic spreadsheet program.

FIG. 1 conceptually illustrates the present invention, and the relationship of the invention to conventional electronic spreadsheets. The system shown in FIG. 1 includes electronic spreadsheet program 12 that is interactively operated by an operator 14, typically via a keyboard and a CRT display. The spreadsheet program could also be operated by a command stream in a batch processing environment. A suitable and representative spreadsheet program is the program available from Lotus Development Corporation under the trademark 1-2-3, and the examples set forth below are based upon the use of this product. Spreadsheet program 12 permits operator 14 to create an active worksheet 16 that includes data strings for one or more cells of a spreadsheet. At any given time, the spreadsheet program produces output spreadsheet 20 corresponding to active worksheet 16. Most commonly, the output spreadsheet is continuously produced on a CRT display, and may be produced in hard copy form in response to a command from operator 14.

Output spreadsheet 20 corresponds to active worksheet 16, in the sense that numeric values and labels contained in the active worksheet appear in the output spreadsheet, format data in the active worksheet is used to format the output spreadsheet, and formulas in the active worksheet are evaluated to produce results that appear in the output spreadsheet. Operator 14 may save a given active worksheet as a worksheet file 22 on a magnetic disk or other storage medium, and the worksheet file can be recalled at a later time for editing, or for the production of output spreadsheet 20. Each particular spreadsheet program 12 has an associated file format specification that defines the format in which data is stored in worksheet file 22. Conceptually, the file format specification also includes the syntax of commands used to cause the spreadsheet program to perform particular actions.

The present invention provides a worksheet file generator 30 for the creation of worksheet file 22 according to the file format specification of a particular spreadsheet program. Preferably, the worksheet file produced by worksheet file generator 30 is complete and ready to be used by spreadsheet program 12, such that operator 14 can produce an output spreadsheet that corresponds to a worksheet file produced by the worksheet file generator, without further data entry or editing. Worksheet file generator 30 operates in response to pattern data 32, variable data 34, and command data 36. In particular, the worksheet file generator merges the pattern data and the variable data, and places the resulting merged data into the worksheet file. In a preferred embodiment, the command data serves principally to identify the pattern data and the variable data to be merged to create a specific worksheet file, and to supply a name for the worksheet file. Preferably, the command data may also specify record selection, i.e., the command data can indicate that only certain records of variable data 34 are to be incorporated into worksheet file 22. The command data may be provided by an operator via a keyboard, via a batch file stored on a magnetic disk, or in any other suitable format. The command data may also be subsumed within worksheet file generator 30, or included within pattern data 32 or variable data 34.

In general, pattern data 32 contains two different kinds of information. First, the pattern data contains information that will be passed through the worksheet file generator, often without modification, into worksheet file 22. Such information includes fixed labels, formulas, format data, and global data. Global data refers to data applicable to more than one spreadsheet cell, such as column widths, default formats, and data protection information. Second, the pattern data contains commands that are interpreted by worksheet file generator 30 to produce various actions. Variable data 34, on the other hand, comprises variable data items, i.e., variable labels and variable numeric values, to be included in a particular worksheet file. By dividing the data to be supplied to worksheet file generator 30 into generally nonvarying pattern data 32 and variable data 34, the pattern data does not need to be reinput by an operator each time that the variable data changes. In addition, as described more fully below, worksheet file generator 30 can produce a plurality of worksheet files 22 in a given operation, each worksheet file utilizing the pattern data and a portion of variable data 34.

Preferably, pattern data 32 is arranged and stored according to the file format specification of spreadsheet program 12. This makes it possible for the pattern data to be created by the spreadsheet program, just as any other worksheet file. In another preferred embodiment, the pattern data is stored in the format of a suitable word processing program, a suitable database program, or a suitable programming language format. Because in practical situations variable data 34 will be provided from a number of different sources, it is advantageous to permit worksheet file generator 30 to receive the variable data in a number of different formats. Preferably, one of such formats is the one defined by the file format specification of the spreadsheet program, so that the variable data can also be created, if desired, by the spreadsheet program itself.

A distinct feature of the present invention is its flexibility. It is not a system for producing a specific worksheet file. Rather it is a system for producing worksheet files according to high-level user instructions contained in the pattern data.

Figure 2:
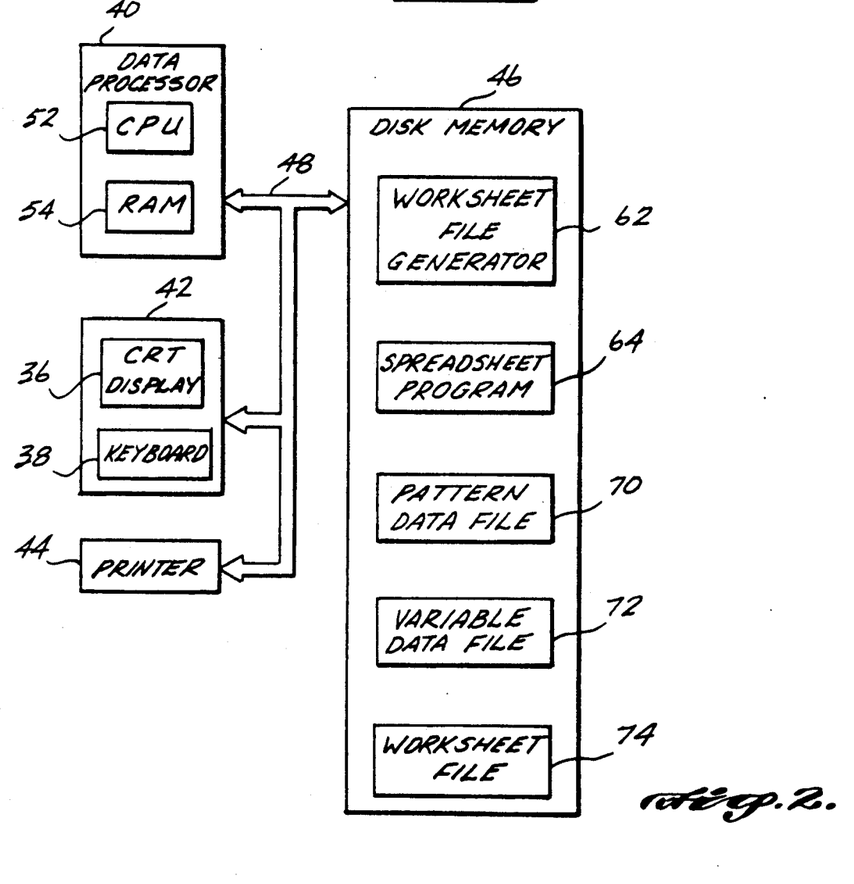
FIG. 2 is a hardware block diagram of a computer system for carrying out the present invention.

FIG. 2 relates the components shown in FIG. 1 to a typical computer hardware arrangement for carrying out the present invention. FIG. 2 illustrates a typical microcomputer architecture, including data processor 40, operator console 42, printer 44 and disk memory 46, all coupled to one another through a suitable bus system 48. Data processor 40 includes CPU 52 and RAM memory 54, the RAM memory being used for the storage of programs being executed, and for the temporary storage of data. Operator console 42 includes a CRT display 36 and keyboard 38, and permits an operator to interact with the computer system. Disk memory 46 stores the program and data files used by the system. For the present application, these files include program files corresponding to the worksheet file generator 62 and spreadsheet program 64, and data files including pattern data file 70, variable data file 72 and worksheet file 74. In a given microcomputer system, there would typically be more than one of each type of data file. In addition, as described below, each variable data file may comprise two or more files or file parts, one for storing the actual variable data items, and a second for storing field definitions. Disk memory 46 may also include one or more command data files for storing command data for the worksheet file generator.

Figure 3:
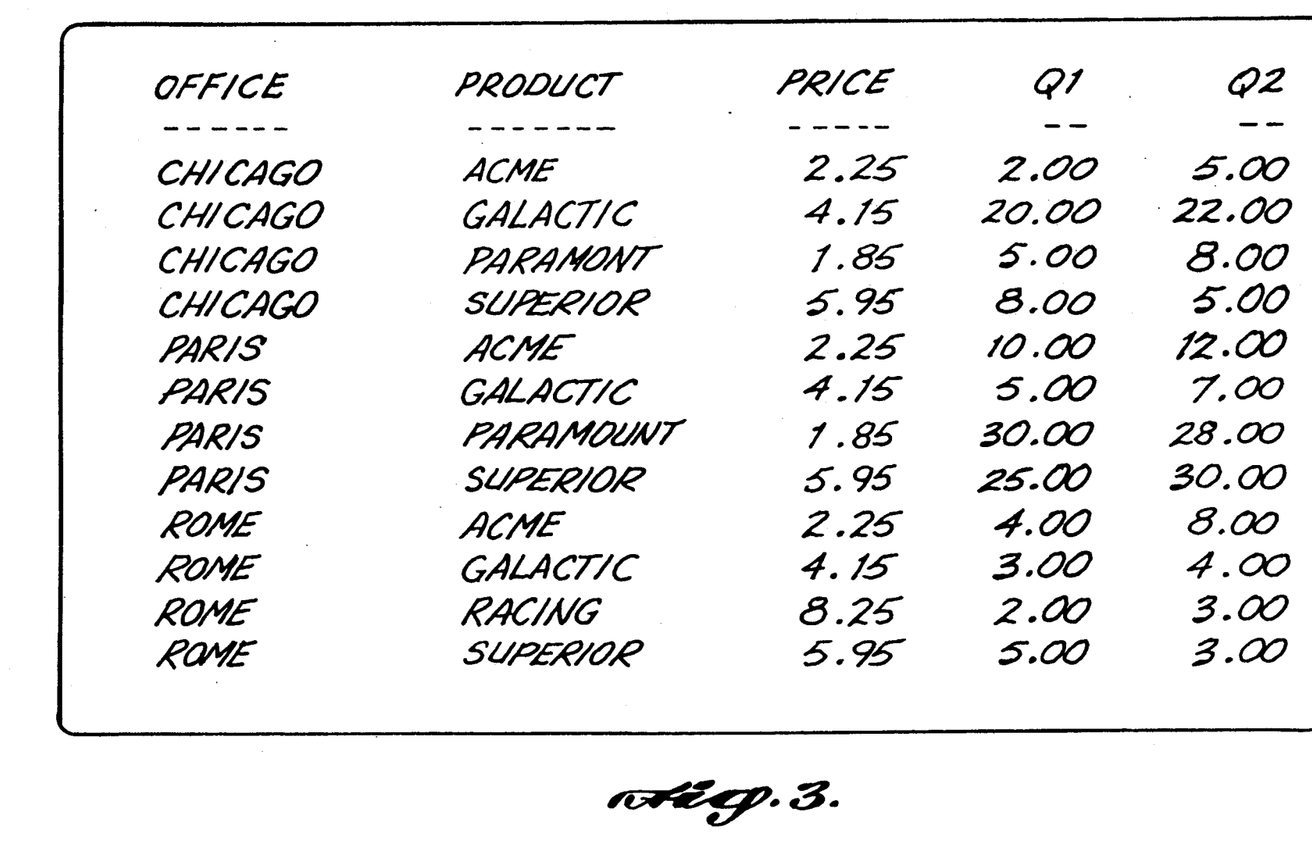
FIG. 3 illustrates a computer screen display representing a sample variable data file.
Figure 5:
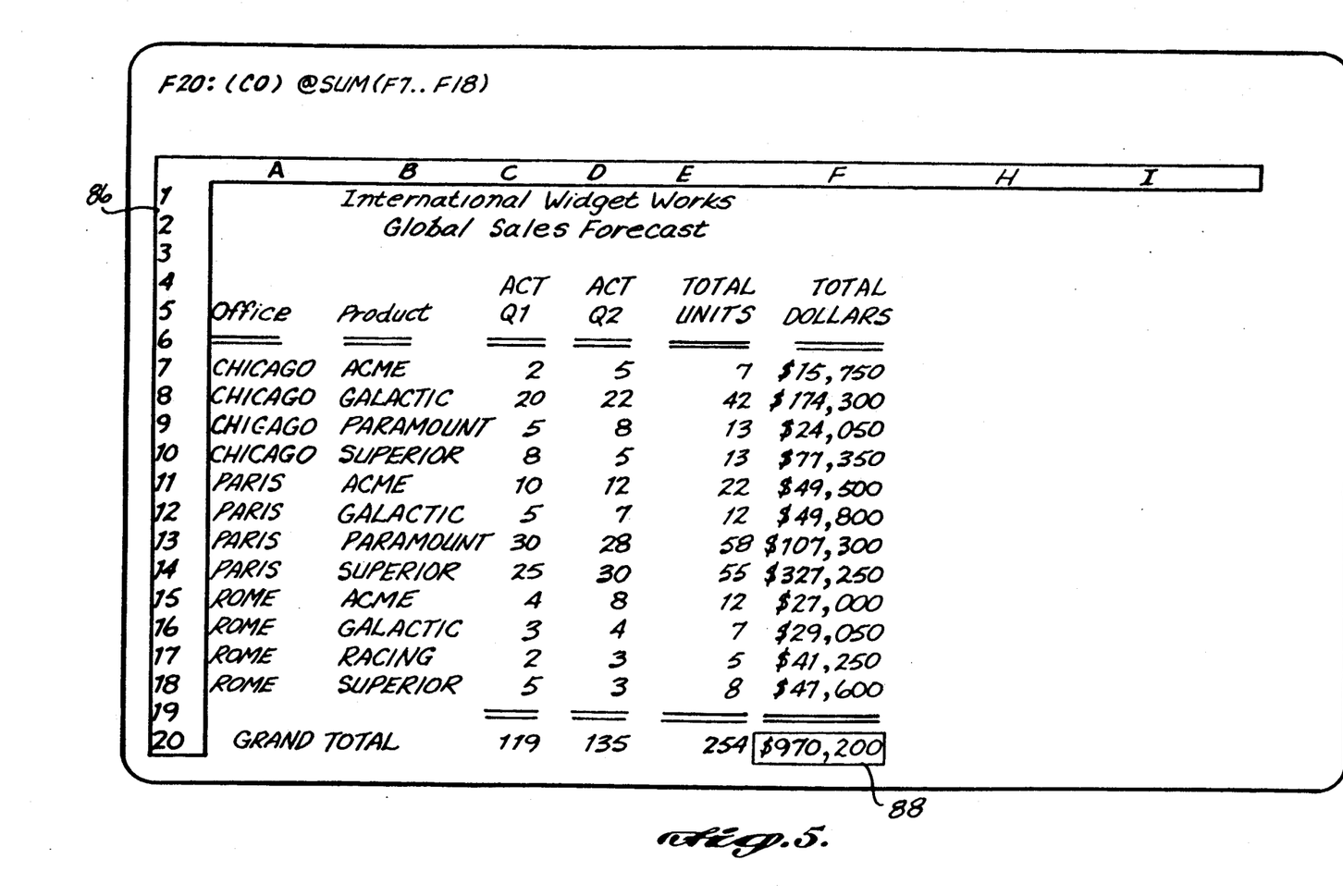

FIGS. 3-5 present a relatively simple example of the operation of the worksheet file generator of the present invention. In particular, FIG. 3 represents a sample variable data file 72, FIG. 4 represents a sample pattern data file 70, and FIG. 5 represents the resulting worksheet file 74 generated by the worksheet file generator in response to these inputs. The example will assume that it is desired to create a spreadsheet showing the sales of a company for the first two quarters of a year, organized by product and by the office from which the sales were made.

Referring initially to FIG. 3, the variable data comprises a simple data set containing field definitions for five fields: OFFICE, PRODUCT, PRICE, Q1, and Q2, and a total of 12 records. Each record contains an alphanumeric or numeric field value for each field. The field values are referred to herein as variable data items. The fields Q1 and Q2 represent the number of units of the corresponding product sold during the first and second quarters respectively of a given year, the price field indicates the price of each unit sold, and the office field indicates the office from which the sales were made. The data illustrated in FIG. 3 may, by way of example, be stored in the format of files produced by a database program marketed by Ashton-Tate under the trademark dBase III. FIG. 3 represents a screen display that could readily be produced based upon such data. This particular file format is self documenting, and includes the names of the fields included in the file. Other formats that are preferably accepted by the worksheet file generator for the variable data include fixed format ASCII, delimited ASCII, variable format reports, and worksheet files. For files that are not self documenting, the variable data typically includes a second file to provide field definitions and whatever additional information is necessary to fully define the file. To simplify the description presented below, each row of the variable data file that includes variable data items (as opposed to file definition information) will hereafter be referred to as an "input record".

FIG. 4 corresponds to the output spreadsheet, as produced by the spreadsheet program on CRT display 36, when the pattern data file used for the present example is loaded by the spreadsheet program as the active worksheet. The display shown in FIG. 4 thus includes cell grid 80 that identifies, in this example, rows 1-20 and columns A-I. These identifiers will henceforth be used to designate the "row" and "column" addresses of particular spreadsheet cells. Display 82 at the upper left had corner of FIG. 4 indicates that cursor 84 is positioned at cell A20, and that this cell does not contain any data string. The grid and cursor are produced by the spreadsheet program, and are not a function of the pattern or variable data file.

In general, the worksheet file generator will pass much of the data in the pattern data file directly through to the worksheet file, and will interpret other data in the pattern data file as file generator commands to perform specific operations. In a preferred embodiment, are three types of file generator commands: partition commands; data insertion commands; and formula construction commands. All three types of commands are illustrated in the example pattern data file shown in FIG. 4. Cells A7 and A9 contain the partition commands !DATA and !FOOTING respectively. These commands serve to partition the pattern data into different portions that have different functions, as further described below. Preferably, all partition commands begin with a single identifying character, such as an !. Data insertion commands comprise the control character > followed by the name of a field in the variable data file. Examples are shown in cells A8 through D8 in FIG. 4. In general, the data insertion commands cause the worksheet file generator to match up the data insertion commands with variable data items from the corresponding fields, and place the results in corresponding positions in a worksheet file. Finally, FIG. 4 illustrates the formula construction command *SUM in cells C11-F11. These commands cause the worksheet file generator to generate a spreadsheet formula, i.e., a formula in the native language of the spreadsheet program. Generally, the arguments of the generated formula depend upon the variable data items, as described in more detail below.

In the example shown in FIG. 4, the !DATA and !FOOTING partition commands serve to divide the pattern data file into three portions: a heading portion consisting of rows 1-6 that occur before the !DATA command, a dataline portion consisting of row 8 between the !DATA and !FOOTING commands, and a footing portion consisting of rows 10 and 11 that occur after the !FOOTING command. In a simple case, the worksheet file generator passes global data contained in the pattern data file directly through into the output worksheet file, passes each row of the heading portion directly through into the output worksheet file, then creates one output row for each input record (in the variable data file) according to the specifications defined by the dataline portion, and then passes each row of the footing portion of the pattern data file into the output worksheet file. Each "row" of data written into the worksheet file by the worksheet file generator will hereafter be referred to as an "output record".

FIG. 5 illustrates the output spreadsheet 20 produced by the spreadsheet program on CRT display 36 when the worksheet file created by worksheet file generator from the variable data file of FIG. 3 and the pattern data file of FIG. 4 is loaded as the active worksheet. The display of FIG. 5 includes grid 86 and cursor 88 that are analogous to grid 80 and cursor 82 shown in FIG. 4. Rows 1-6 of FIG. 5 correspond to the heading portion in rows 1-6 of FIG. 4. Rows 7-18 of FIG. 5 correspond to the dataline portion in row 8 of FIG. 4, there being one such row in FIG. 5 for each input record shown in FIG. 3. Finally, rows 19 and 20 in FIG. 5 correspond to the footing portion consisting of rows 10-11 in FIG. 4. As indicated by comparing FIGS. 3-5, worksheet file generator has copied the contents of the cells in rows 1-6 of the pattern data directly into the worksheet file without alteration. The data from the heading portion that was passed through includes not only the labels that appear in FIGS. 4 and 5, but also format information relating to particular cells. In addition, it will be noted that column G is missing from FIGS. 4 and 5. This is because it has been assumed, for the purpose of the present example, that the pattern and worksheet files illustrated in FIGS. 4 and 5 include codes indicating that column G should not be displayed, i.e., column G is a "hidden" column in the lexicon of spreadsheet programs.

The dataline portion (row 8) of FIG. 4 includes the data insertion commands >OFFICE, >PRODUCT, >Q1 and >Q2 in columns A-D respectively, and cell G8 (hidden) includes the data insertion command >PRICE. For each data insertion command, the worksheet file generator attempts to associate the field name following the > character to one of the field names defined by the variable data file. If a match is found, then for each input record in the variable data file, the contents of that field is placed in the associated cell when the worksheet file generator produces each corresponding output record. Thus as shown in FIG. 5, the result is that for each input record, the OFFICE, PRODUCT, Q1 and Q2 variable data items appear in columns A-D of FIG. 5, the only modification being that the format information contained in the pattern data file cells C8 and D8 has eliminated the unnecessary decimal point in these columns.

Still referring to the dataline portion (row 8) of FIG. 4, cell E8 contains the string: @SUM(C2 ... D2). This string is a spreadsheet command in the native language of the spreadsheet program. The spreadsheet command comprises a formula that instructs the spreadsheet program that the display corresponding to this cell should be determined by adding the contents of cells C2 through D2 of the same row. The worksheet file generator passes this spreadsheet command directly into the worksheet file without modification. Thus as shown in FIG. 5, the value displayed by the spreadsheet program in column E is the sum of the two data values appearing in columns C and D of the same row.

Cell F8 of the pattern data file contains the string: E2I2*1000. This string is a spreadsheet command, in the native spreadsheet program language, that instructs the spreadsheet program to display the product of the contents of cells E2 and G2 multiplied by 1000. Cell G8 contains the hidden price data. Thus by comparing FIGS. 3 and 5, it can be seen that for each of rows 7-18 in FIG. 5, the value displayed in column F is the product of the number of units shown in column 7, times the corresponding price (shown in FIG. 3 but hidden in column G of FIGS. 4 and 5), multiplied by 1000.

After all of the output records corresponding to the dataline portion of the pattern data file have been created, the worksheet file generator produces the two output records that appear as rows 19 and 20 of FIG. 5. Referring back to FIG. 4, it can be seen that these footing records contain labels in cells C10-F10 and A11, and the formula construction command: *SUM in cells C11-F11. This formula construction command instructs the worksheet file generator to generate a corresponding spreadsheet command and to insert the generated spreadsheet command into the corresponding output cell. The corresponding spreadsheet command is one which instructs the spreadsheet program to display the sum of all dataline values in the corresponding column. Thus in cell C20 of the output worksheet file, for example, the worksheet file generator places the string: @SUM(C7 ... C18). This string comprises a spreadsheet command that, when interpreted by the spreadsheet program, causes the sum of cells C7-C18 to be displayed in cell C20 of the output spreadsheet. Similar operations are performed in columns D-F. Note that this formula could not have been stored in the pattern data file and passed directly through to the output worksheet file, as was done for the commands contained in cells E8 and F8 of the pattern data file, because until the variable data file shown in FIG. 3 was read, the number of rows that would have to be summed was unknown. Thus the formulas in cells C20-F20 of the output worksheet file could not have been determined beforehand. This automatic generation of spreadsheet commands in response to formula construction commands is one of the most powerful features of the worksheet file generation technique of the present invention. Preferably, the worksheet file generator is capable of processing formula construction commands corresponding to each spreadsheet command of the native spreadsheet language. For example in a preferred embodiment, the formula construction commands that may be used include the summation command (*SUM) included in the above example, as well as commands for a count (*CNT), minimum (*MIN), maximum (*MAX), standard deviation (*STD), and variance (*VAR).

Figure 6:
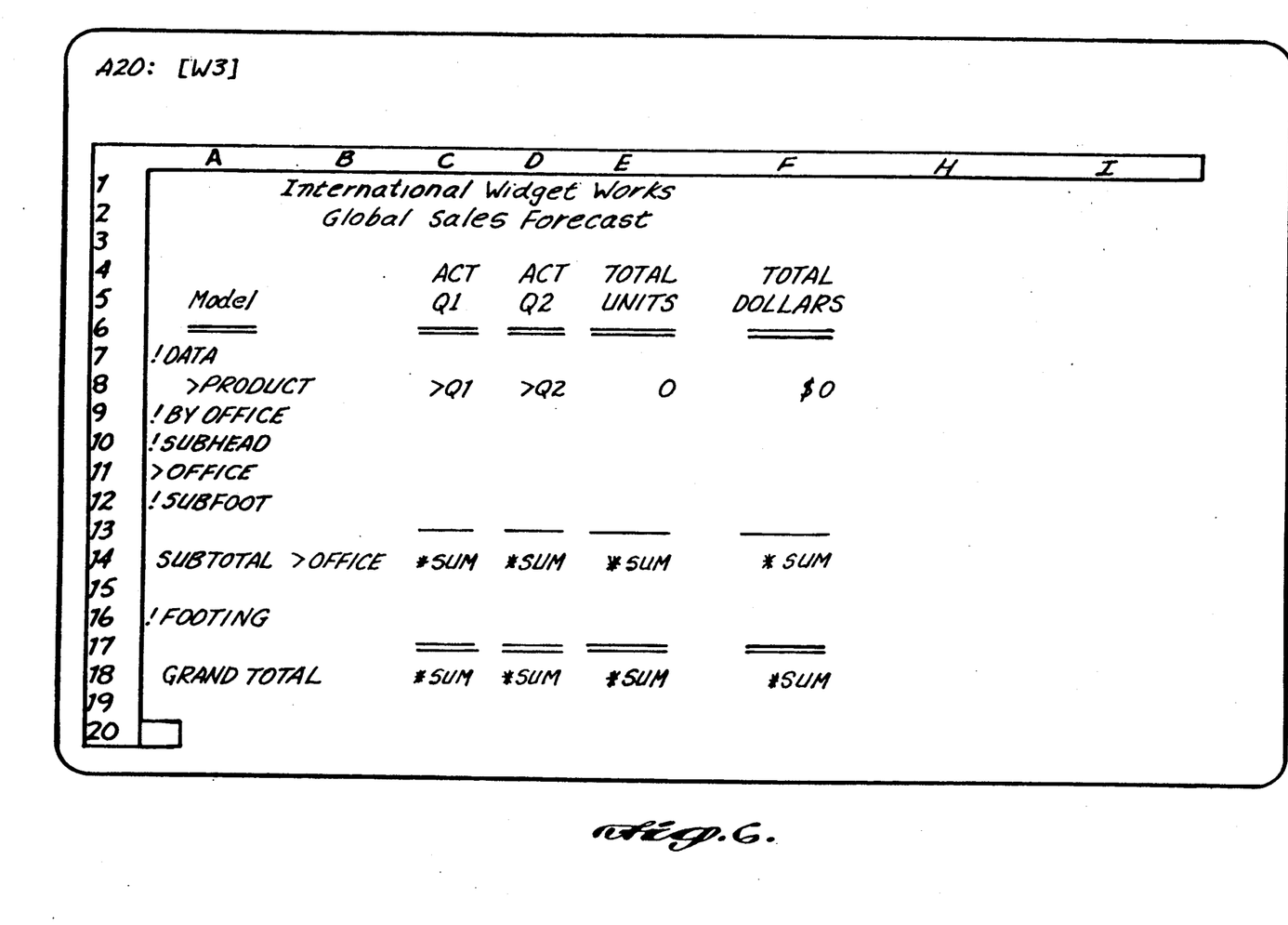
FIGS. 6 and 7 illustrate computer screen displays of a second pattern data file and the resulting worksheet file.
Figure 7:
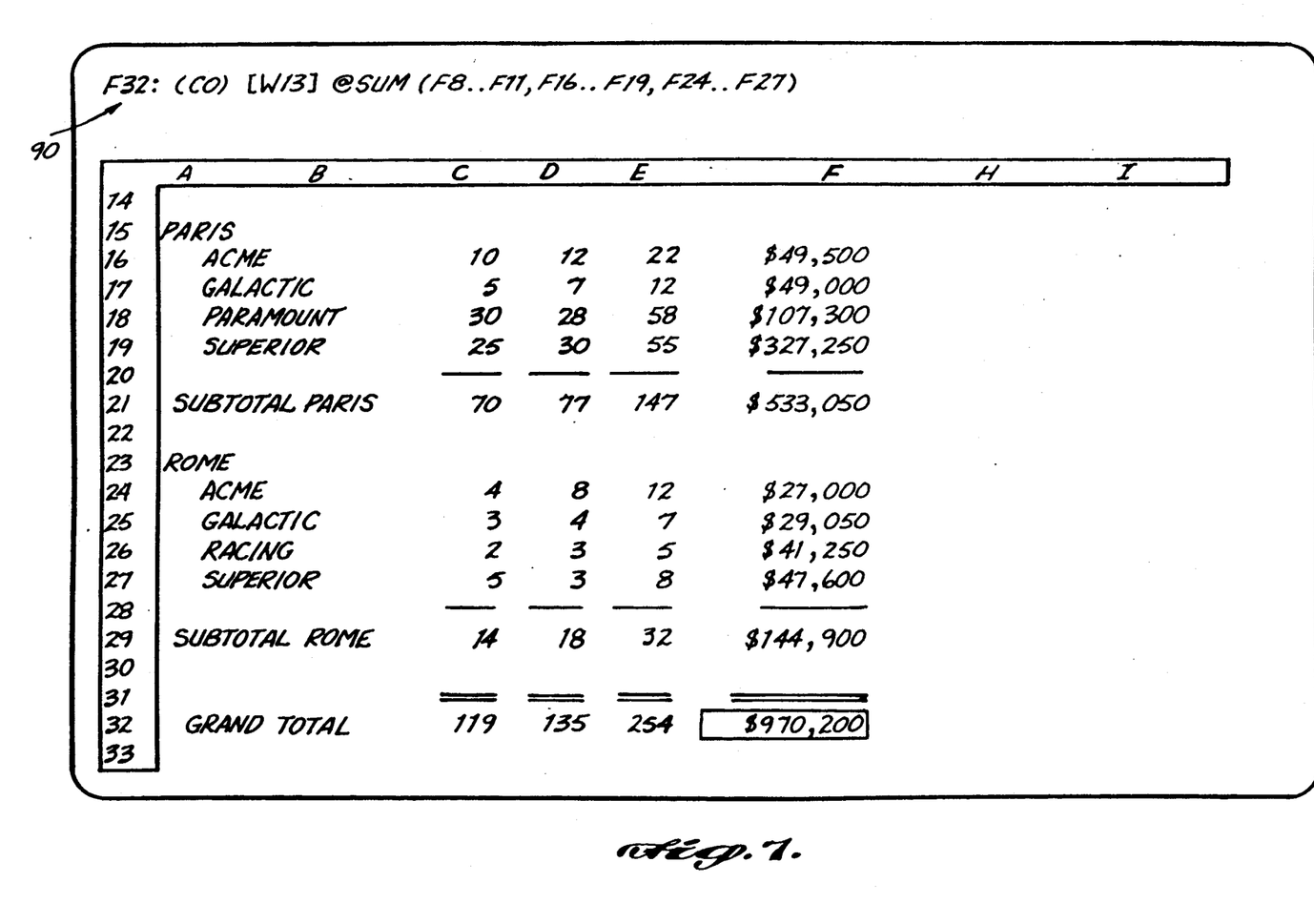

The worksheet file generator preferably includes means to enable an operator to produce a worksheet file that will cause data to be subtotaled when the corresponding output spreadsheet is produced. In the output spreadsheet shown in FIG. 5, there is a separate row for each combination of values in the OFFICE and PRODUCT field. FIGS. 6 and 7 illustrate the use of the present invention to produce output spreadsheets having subtotals for each office. In particular, FIG. 6 corresponds to a new pattern data file analogous to FIG. 4, while FIG. 7 corresponds to a new output worksheet file, analogous to FIG. 5.

The subtotaling feature of the present invention is provided by defining three additional partition commands: !BY, !SUBHEAD AND !SUBFOOT. These commands appear on rows 9, 10 and 12 of FIG. 6. The !BY command is followed by the name of a field (the OFFICE field in the example of FIG. 6), and causes the variable data file to be sorted by the designated field, prior to merging the variable data with the pattern data to produce the worksheet file. The !SUBHEAD command, appearing after a !BY command, indicates to the worksheet file generator that the rows following the !SUBHEAD command, up to but not including the next partition command (identified by an !) comprise a subheading portion that it is to be placed in the output worksheet file before the first row of variable data, and whenever the field designated by the !BY command changes. Thus rows 9-11 of FIG. 6 cause the variable data to be sorted by OFFICE (in the present example, the variable data is already sorted by this field), and then cause the variable data item in the OFFICE field to be printed each time that the value of the OFFICE field changes.

The !SUBFOOT command indicates that the rows following the !SUBFOOT command, down to the next partition command, comprise a subfooting portion that is to be printed every time the value of the !BY field changes. In FIG. 6, the subfooting to be printed comprises rows 13-15. The subfooting rows can comprise any fixed labels, data insertion commands, or formula construction commands such as *SUM.

FIG. 7 displays the lowermost portion of the displayed spreadsheet corresponding to the worksheet file generated by the worksheet file generator from the pattern data of FIG. 6 and the variable data of FIG. 3. Display 90 on the upper part of FIG. 7 indicates that cell F32 (the current cursor location) contains a spreadsheet command for summing the total sales figures in the appropriate rows. Examination of cell F29 would show that it contained the following string: (C8) [W13]@SUM (F24 ... F27), this string including the spreadsheet command for calculating the subtotal in cell F29 for the ROME office.

Figure 8:
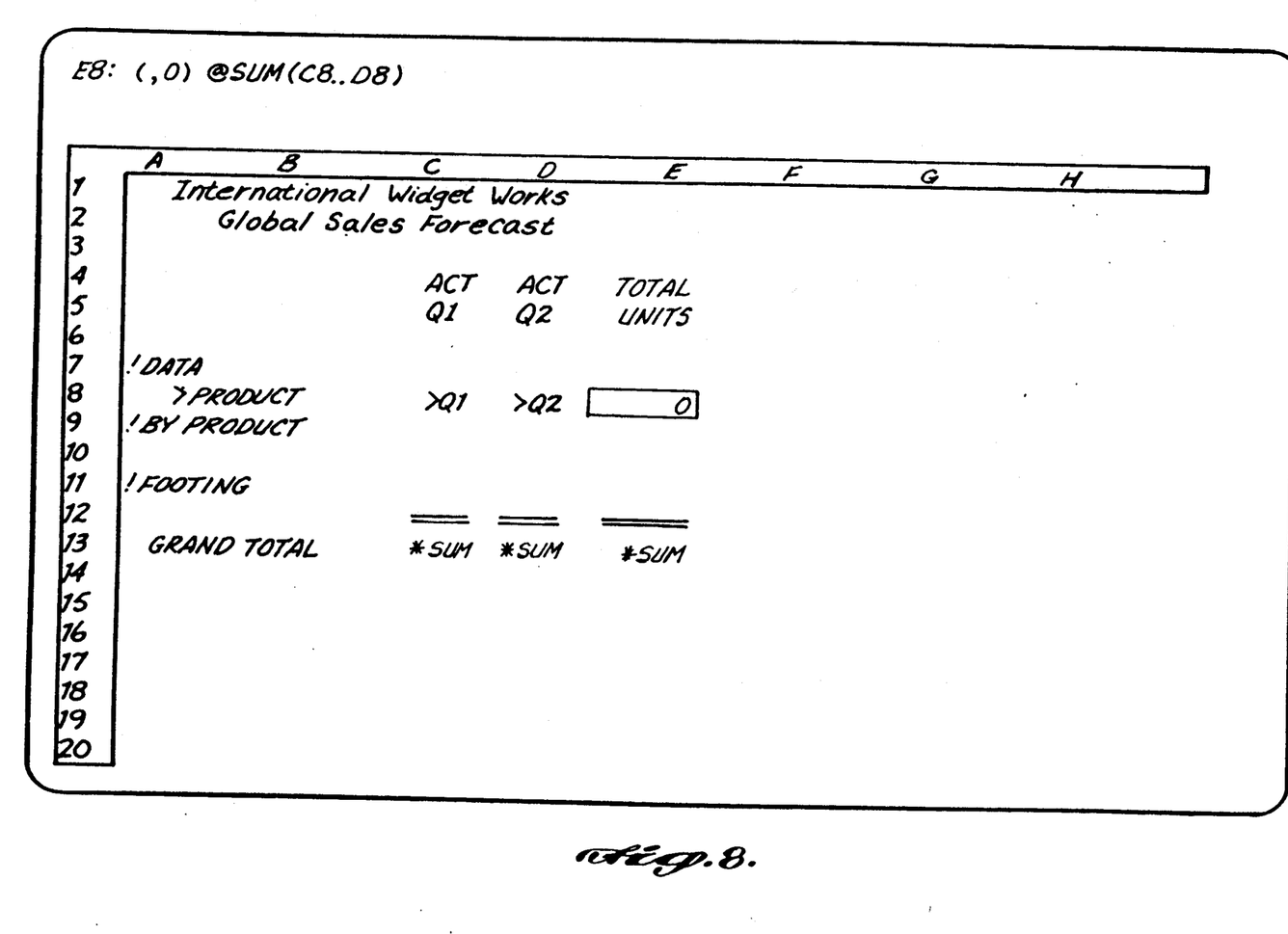
FIGS. 8 and 9 illustrate computer screen displays of a third pattern data file and the resulting worksheet file.
Figure 9:
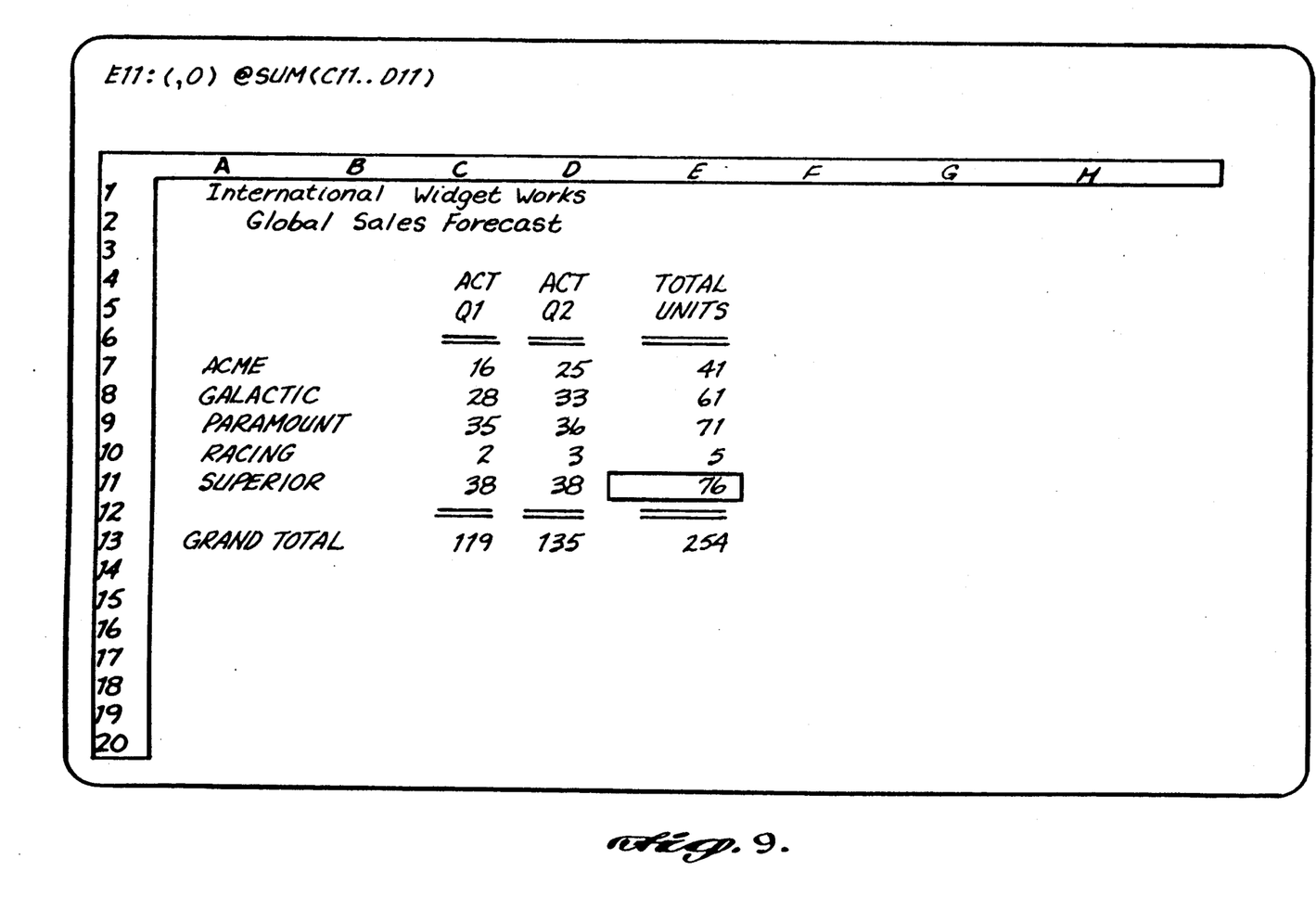

In a preferred embodiment, the present invention also includes means for aggregating variable data to produce the output worksheet file. Data aggregation is preferably triggered by including an appropriate command as part of command data 36 (FIG. 1). An example is presented in FIG. 8, which shows a pattern data file, and in FIG. 9 which shows the resulting worksheet file. FIG. 9 includes an output record corresponding to each value found in the product field in the variable data file. When aggregating data in this manner, the worksheet file generator sums numeric fields, and uses the first value found for each nonnumeric field. Alternatively, aggregation can be specified by the pattern data. In a further embodiment, aggregation can be produced by constructing an appropriate aggregation formula, and placing the formula in the worksheet file.

Figure 10:
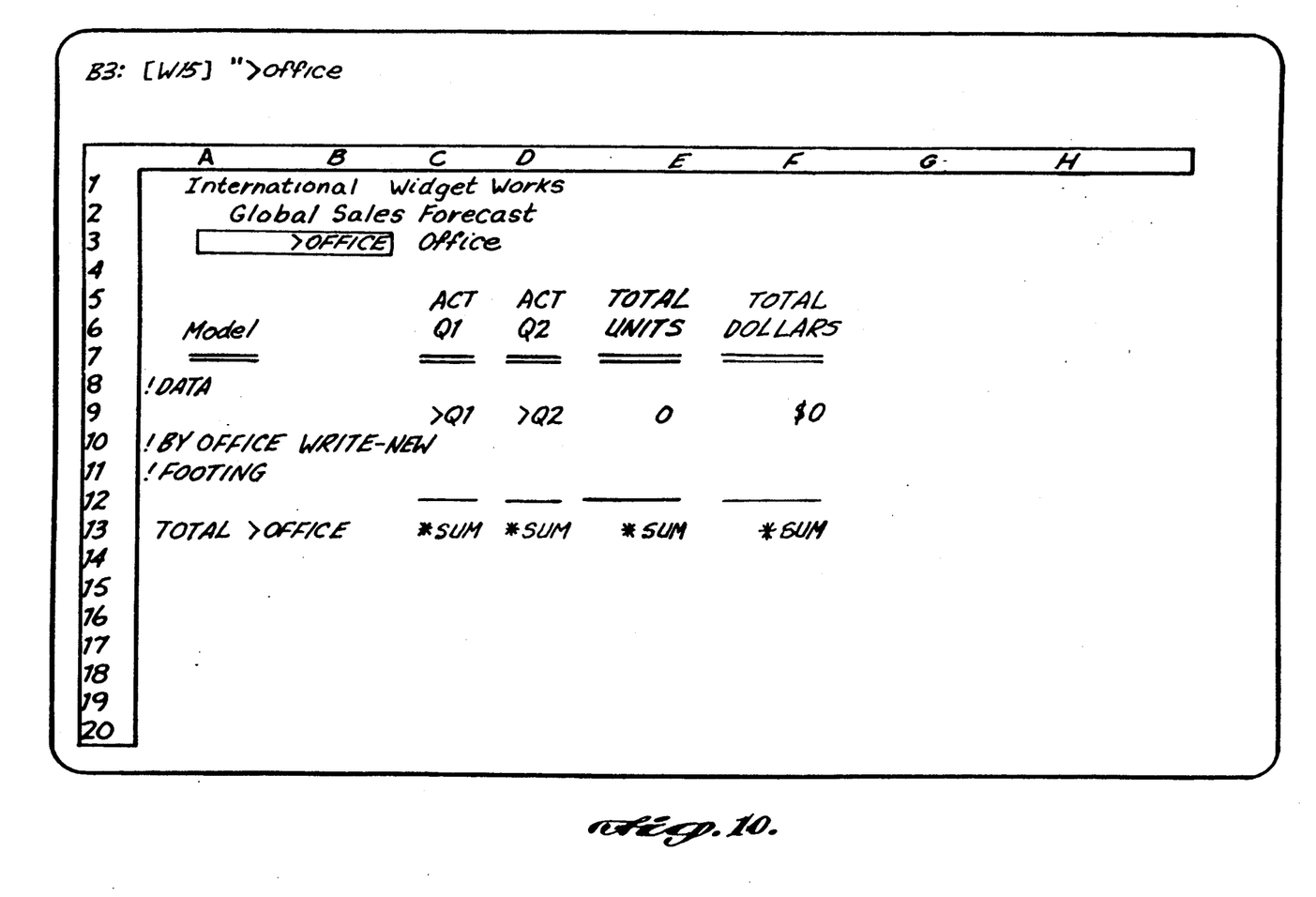
FIGS. 10 and 11 illustrate computer screen displays of a fourth pattern data file and the resulting worksheet file.
Figure 11:
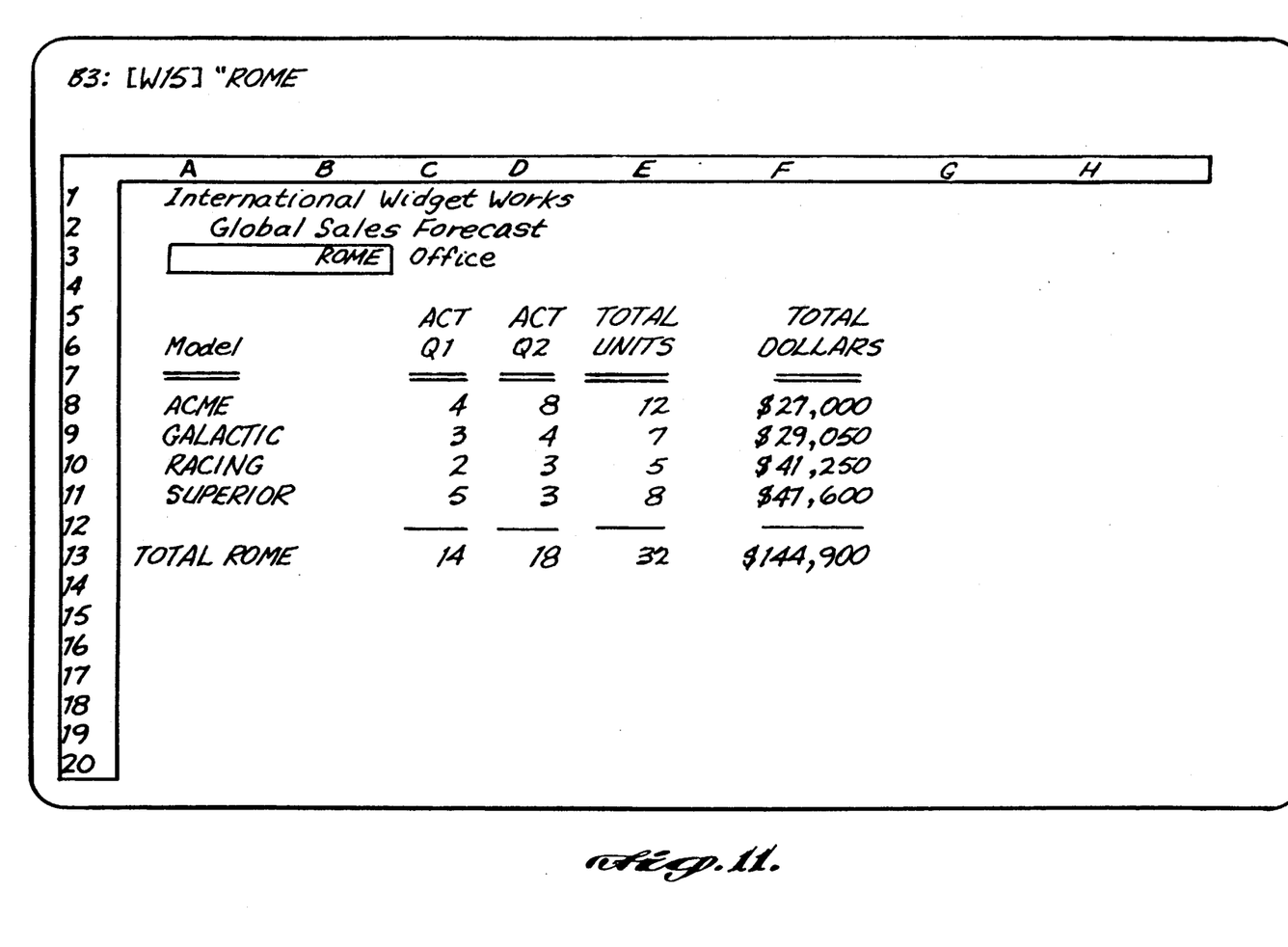

A further preferred feature of the invention is the ability to produce more than one output worksheet file in response to a given pattern data file and a single variable data file. In a preferred embodiment, this feature is available by adding the WRITE-NEW modifier to a !BY command. An example of the production of multiple output worksheet files is set forth in FIGS. 10 and 11. FIG. 10 presents a display of the pattern data file, and shows the modified !BY command designating the OFFICE field in row 10. Because there are three different values in the OFFICE field in the variable data file shown in FIG. 3, worksheet file generator responds by producing three output worksheet files, one corresponding to each OFFICE value. The displayed spreadsheet corresponding to one of such output worksheet files is shown in FIG. 11. One suitable method for generating the file names of multiple output worksheet files is for the operator to provide a template file name via command data 36, the template file name comprising a wild card character. Worksheet file generator 30 then constructs names for the output worksheet files by substituting the value of the !BY field associated with each output file into the template.

FIGS. 10 and 11 also illustrate a further preferred feature of the invention. Referring to row 3 of FIG. 10, the data insertion command >OFFICE appears in the heading portion of the pattern data file. Whenever a data insertion command appears in this manner in the heading portion, the value from the corresponding field of the first input record used to produce the worksheet file is inserted in place of the field identifier. The first input record will be the first data record in the variable data file when sorting has not been specified, or the first input record in a sorted data file when sorting has been requested by use of the !BY command. The result produced by row 3 of the pattern data file displayed in FIG. 10 can be seen in row 3 of FIG. 11. Preferably, data insertion commands in the footing portion of the pattern data file cause substitution of the designated field value from the last record used to produce the worksheet file.

Figure 12:
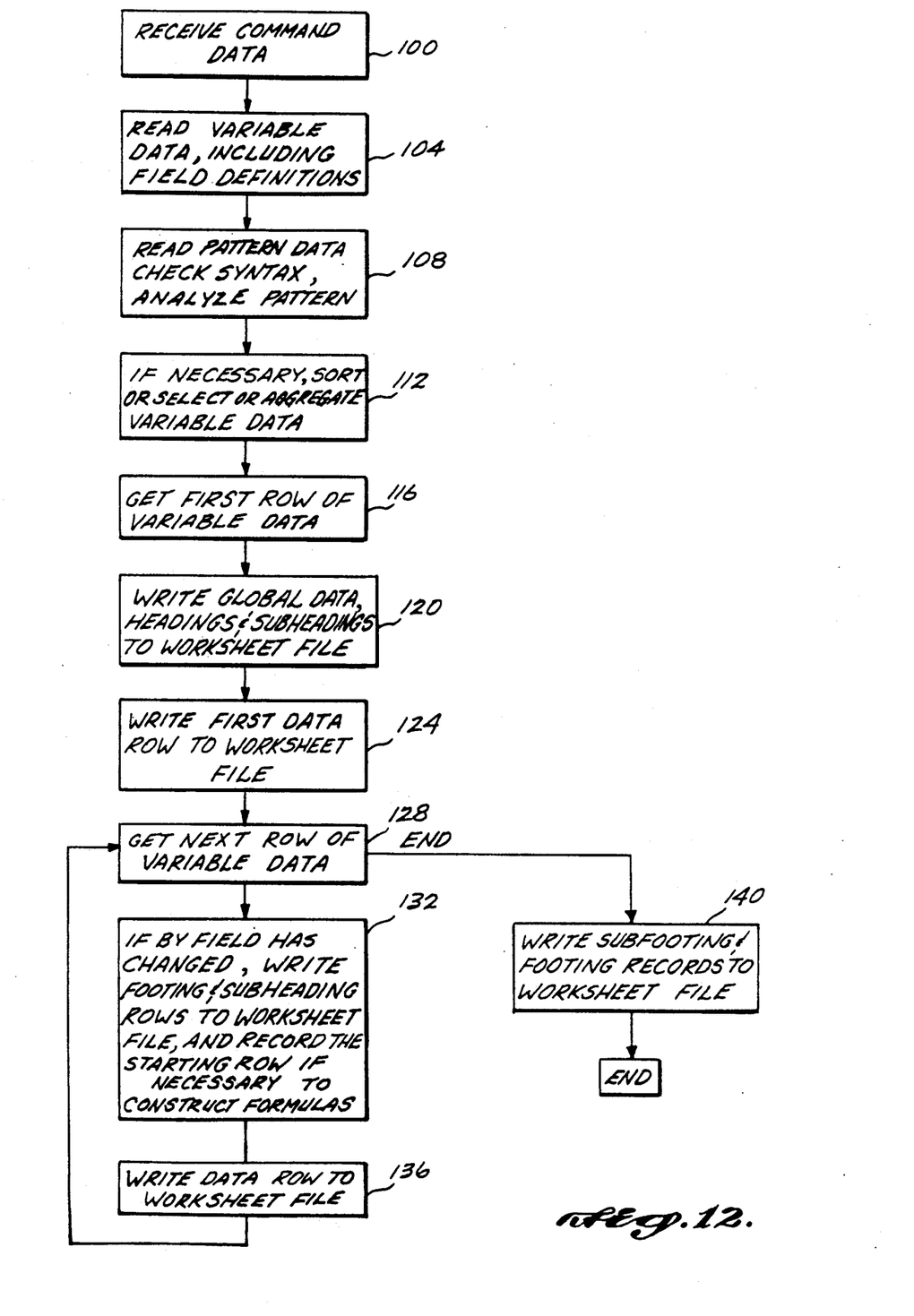
FIG. 12 is a flow chart outlining a suitable computer program for carrying out the present invention.

An outline of a suitable computer program for implementing worksheet file generator 30 is set forth in FIG. 12. The operation of the program commences in block 100 by receiving command data 36. Preferably, the command data identifies the names of the files containing the pattern data, the names of the files containing the variable data, the name (or template name, if any) of the worksheet file to be created by the program, and whether data aggregation is to occur. The program flow then proceeds to block 104, wherein the variable data is read. For a self-documenting file (one containing the field definitions and the data), such as the one illustrated in FIG. 3, only a single file must be input at this point. For a file which is not self-documenting, the file definition could be either contained in the command data, or contained in a file designated by the command data or by the variable data file.

In block 108, the program reads the pattern data file identified by the command data, checks the pattern data for correct syntax, and analyzes the pattern data to thereby determine the portions that are present and an outline for subsequent program steps. For example, block 108 parses the pattern data into global data and into heading, dataline and footing portions, and determines whether the pattern data includes a !BY command. In block 112, if a !BY command is present, then the variable data is sorted by the identified sort field. If data aggregation has been requested, then the variable data is sorted and then aggregated so as to produce one record of variable data corresponding to each value in the specified sort field. If data selection has been specified by the command or pattern data, then the appropriate selection is also carried out at this point.

In block 116, the program gets the first input record. For sorted or aggregated data, this should be understood to refer to the first record of sorted or aggregated data. Block 120 then writes the global data and the heading and subheading rows, if any, to the worksheet file. Block 124 then writes the first data record to the worksheet file, and block 128 gets the next row of variable data. In block 132, the program determines whether a BY field value has changed. If so, then the appropriate footing and subheading rows, if any, are written to the worksheet file. In addition, the program records the starting row corresponding to the new BY field value, if necessary to construct spreadsheet commands requested by formula construction commands in the pattern data. An example is shown in FIG. 7, wherein the worksheet file generator constructed the formula shown in cell F32 by recording the changes in value of the OFFICE field, in response to the worksheet file generator contained in cell A9 of FIG. 6. Once the steps indicated in block 132 have been completed, block 136 then writes the data rows to the worksheet file, and flow is returned to block 128 to get the next row of variable data. When the end of the variable data is reached, block 140 writes the subfooting and footing records, if any, to the worksheet file, and the program ends.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A method for use on a computer for producing a worksheet file for use by an electronic spreadsheet program, the spreadsheet program having an associated file format specification that defines a format in which the spreadsheet program stores and retrieves data, the spreadsheet program further including means for processing data in said format to produce an output spreadsheet, the method comprising:
   receiving from computer memory a pattern data file containing pattern data specifying positions for one or more variable data items to appear on the output spreadsheet;
   receiving from computer memory a variable data file containing variable data specifying the variable data items;
   merging the pattern and variable data to produce merged data specifying the variable data items and the positions for the variable data items; and
   outputting the merged data into the worksheet file in said format, whereby the spreadsheet program can use the worksheet file to produce the output spreadsheet having the variable data items at said positions.

2. The method of claim 1, wherein the received pattern data is in said format, whereby the pattern data can be created by the spreadsheet program.

3. The method of claim 1, wherein the merging step comprises aggregating a plurality of variable data items to produce an aggregated data item and producing merged data specifying the aggregated data item.

4. The method of claim 1, wherein the outputting step comprises outputting the merged data into a plurality of worksheet files such that each variable data item is contained in a different worksheet file.

5. The method of claim 1, wherein the pattern data includes fixed data specifying one or more fixed data items and a position at which each fixed data item is to appear on the output spreadsheet, and wherein the merged data includes said fixed data.

6. The method of claim 1, wherein the merging step comprises producing merged data specifying a formula, the formula comprising an instruction that will cause the spreadsheet program to determine an evaluated data item based upon one or more variable data items and to include the evaluated data item in the output spreadsheet.

7. The method of claim 6, wherein the formula is produced such that the number of variable data items that will be used by the spreadsheet program to determine the evaluated data item is a function of the number of variable data items received.

* * * * *